June 14, 1960 W. L. ROBERTS 2,941,145
APPARATUS FOR MEASURING THE SPEED OF TRAVELING STRIP
Filed Aug. 26, 1958
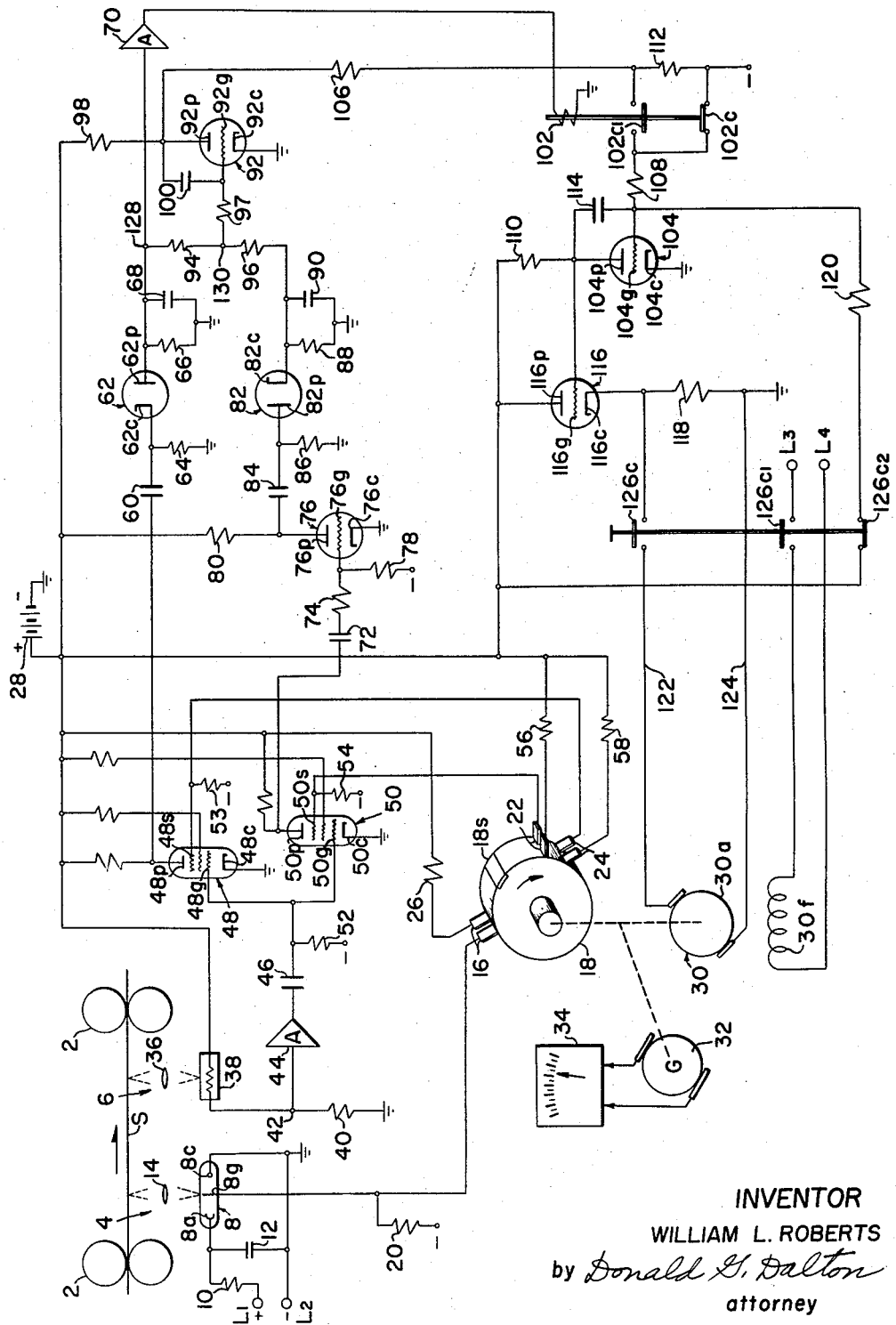
INVENTOR
WILLIAM L. ROBERTS
by Donald G. Dalton
attorney

United States Patent Office 2,941,145
Patented June 14, 1960

2,941,145

APPARATUS FOR MEASURING THE SPEED OF TRAVELING STRIP

William L. Roberts, Monroeville, Pa., assignor to United States Steel Corporation, a corporation of New Jersey Filed Aug. 26, 1958, Ser. No. 757,365

5 Claims. (Cl. 324—70)

This invention relates to apparatus for measuring the speed of traveling strip and more particularly to measuring the speed of thin steel strip. The apparatus presently used for measuring the speed of strip generally requires that the strip be contacted with a measuring roll or other device. Such apparatus may damage the strip, especially when the strip is moving at high speeds.

It is therefore an object of my invention to provide apparatus for measuring the speed of traveling strip by impressing a hot spot upon the strip and measuring the speed of travel of the hot spot.

This and other objects will be more apparent after referring to the following specification and attached drawing, in which the single figure is a schematic view of my device.

Referring more particularly to the drawing, reference numeral 2 indicates spaced apart pairs of rotating rolls between which the strip S travels. The strip may be made of any material which does not have an excessively high thermal conductivity. Located between rolls 2 adjacent the path of travel of the strip S are hot spot impressor 4 and hot spot detector 6. Hot spot impressor 4 includes an infrared energy source 8 which is shown as a triggered gas discharge tube having an anode $8a$, cathode $8c$ and grid $8g$. One tube suitable for this purpose is a Sylvania Strobotron type R4350. D.C. power is supplied to the tube 8 from a high voltage source L1—L2. L1 is connected to the anode $8a$ through resistor 10 and the cathode $8c$ is connected to L2 which is at ground potential. A capacitor 12 is connected between anode $8a$ and cathode $8c$. The infrared energy emitted by discharge of the energy source 8 is focused on the strip S by means of a lens 14. Grid $8g$ is connected to one side of a dual brush 16 associated with a rotatable timing wheel 18. The grid $8g$ is also connected to a negative bias through a resistor 20. The periphery of wheel 18 is made of a non-conducting material and has a conducting segment $18s$ attached thereto which extends transversely of the face thereof so that it will contact both sides of the dual brush 16 at the same time. Spaced from the dual brush 16 along the periphery of wheel 18 are two additional dual brushes 22 and 24 arranged in the same manner as dual brush 16. Brush 22 is located as close as possible to brush 24 with the limitation that the brushes are sufficiently spaced so that the conducting segment $18s$ cannot contact both dual brushes at the same time. The other side of brush 16 is connected through a resistor 26 to the positive terminal of a D.C. power source 28. The wheel 18 is driven by means of a motor 30 having armature $30a$ and field winding $30f$. Wheel 18 is also mechanically connected to drive a tachometer generator 32, the output of which is connected to a meter 34 which is calibrated to read strip speed in feet per minute. The hot spot detector 6 includes a lens 36 which focuses the heat from the hot spot on the strip S onto a detecting cell 38. The detecting cell 38 may be any standard type of infrared sensing device with a short time constant, such as a lead sulfide cell or a cadmium sulfide cell. The cell 38 is connected to the positive side of power source 28 and is part of a voltage dividing circuit including resistor 40. When infrared energy from the hot spot on the strip S is impressed upon the cell 38 the resistance across the cell decreases thereby causing the current from voltage source 28 through cell 38 and resistor 40 to increase. This increase of current causes the voltage at point 42 to rise. Point 42 is connected to an amplifier 44 and the amplified voltage from amplifier 44 passes through a capacitor 46 to control grids $48g$ and $50g$ of vacuum pentodes 48 and 50. The pentodes 48 and 50 are gated amplifiers and have cathodes $48c$ and $50c$, plates $48p$ and $50p$ and suppressor grids $48s$ and $50s$. Control grids $48g$ and $50g$ are connected through a resistor 52 to a negative bias. The value of the capacitance of capacitor 46 and the resistance of resistor 52 are such that the time constant will be approximately equal to the time the conductor segment $18s$ takes to travel from brush 22 to brush 24 when the timing wheel 18 is rotating at ordinary operating speeds. Brushes 22 and 24 are connected to suppressor grids $50s$ and $48s$, respectively. Grids $48s$ and $50s$ are also connected to a negative bias through resistors 53 and 54, respectively. Brushes 22 and 24 are also connected through resistors 56 and 58, respectively, to the positive terminal of voltage source 28. Plate $48p$ is connected through a capacitor 60 to cathode $62c$ of diode 62. Cathode $62c$ is also connected through resistor 64 to ground. Plate $62p$ is connected to ground through resistor 66 and capacitor 68 connected in parallel. Plate $62p$ is also connected to an amplifier 70. Plate $50p$ is connected through a capacitor 72 and resistor 74 to grid $76g$ of tube 76. Grid $76g$ is also connected through a resistor 78 to a negative bias. The positive terminal of power source 28 is connected to plate $76p$ through resistor 80. Plate $76p$ is connected to plate $82p$ of diode 82 through a capacitor 84. Plate $82p$ is also connected to ground through resistor 86. Cathode $82c$ is connected to ground through resistor 88 and capacitor 90 connected in parallel. Plate $62p$ is connected to grid $92g$ of tube 92 through resistors 94 and 97. Cathode $82c$ is connected to grid $92g$ through resistors 96 and 97. Positive terminal of power source 28 is connected to plate $92p$ through resistor 98. Capacitor 100 is connected across plate $92p$ and grid $92g$. The output of amplifier 70 is connected to relay coil 102 having a normally closed contact 102C and normally open contact 102C1. Plate $92p$ is connected to grid $104g$ of tube 104 through resistor 106, contact 102C1 and resistor 108. The positive terminal of power source 28 is connected to plate $104p$ through resistor 110. Grid $104g$ is connected to a negative bias through resistor 108, contact 102C1 and resistor 112 or alternately through resistor 108 and contact 102C. Capacitor 114 is connected across plate $104p$ and grid $104g$. Plate $104p$ is connected to grid $116g$ of cathode follower tube 116. Plate $116p$ is connected to the positive terminal of power supply 28. Cathode $116c$ is connected to ground through a resistor 118. Grid $104g$ is connected to the positive terminal of power source 28 through a resistor 120. The output of tube 116 is connected to armature $30a$ through leads 122 and 124. Field $30f$ is connected to power source L3—L4. Switch 126 having contacts 126C, 126C1 and 126C2 controls the operation of motor 30. Additional resistances may be inserted in the circuits as desired.

The operation of my device is as follows: Switch 126 is actuated to close contacts 126C and 126C1 and open contact 126C2. Closing of contacts 126C and 126C1 causes motor 30 to start rotating. When the voltage across resistor 118 is at its minimum value the armature current is also at its minimum value so that the motor will start turning slowly. The value of the capacitance of condenser 114 and the resistance of resistor 108 are such the positive potential on control grid 104g will decrease slowly. As this grid potential decreases the potential of plate 104p will increase and this will cause cathode follower 116 to conduct more heavily. The resultant increased voltage drop across resistor 118 will cause the speed of the motor 30 to gradually increase. When conducting segment 18s of the rotating wheel 18 contacts brush 16 momentarily, the circuit is completed to grid 8g causing tube 8 to fire and to impress a hot spot on strip S. As timing wheel 18 continues to rotate the circuit through brush 16 and conducting segment 18s is interrupted and the trigger electrode 8g goes negative because it is connected only to a negative bias through resistor 20. This prevents tube 8 from refiring while it is readied for its next discharge by the recharging of capacitor 12 from power source L1—L2 through resistor 10. When the hot spot on strip S reaches the detector 6 the energy radiated will be focused by lens 36 onto detecting cell 38. This decreases the resistance across the cell thereby causing the current from voltage source 28 through cell 38 to increase so that the voltage at point 42 increases. The signal at point 42 is amplified and impressed through capacitor 46 onto control grids 48g and 50g of vacuum tubes 48 and 50. The voltage of suppressor grid 50s is normally at a value sufficiently negative to cut the tube off so that a positive signal on control grid 50g will have little or no effect on the potential of plate 50p. Therefore, the positive signal from point 42 will effect the potential of plate 50p only when the voltage on the suppressor grid 50s has been made positive by a voltage from power supply 28 through resistor 56, brush 22 and conducting segment 18s. Because the periphery of timing wheel 18 is traveling much slower than strip S, the hot spot on the strip S will reach the detector 6 before the conducting segment 18s reaches brush 22. Therefore, the positive signal from detector 6 on control grid 50g will have dissipated and the negative voltage through resistor 52 will cause the grid 50g to cut off the tube 50 before the positive signal through brush 22 reaches the suppressor grid 50s. Segment 18s will also contact brush 24 after the signal from point 42 reaches grid 48g so that tube 48 will not pass the positive signal applied at this time to the control grid 48g. In the meantime, capacitor 114 is discharged through resistor 108 and relay contact 102C to the negative bias, thus causing the voltage on grid 104g to decrease which in turn causes the voltage on plate 104p to increase. This increased voltage acting through cathode follower 116 and resistor 118 causes the speed of the timing wheel 18 to increase. This increased speed causes the hot spots impressed on the strip S to become more closely spaced and also causes the conducting segment 18s to contact brush 22 a shorter time interval after the hot spot is impressed. Thus, the time that the suppressor grid 50s goes positive approaches the time at which the control grid 50g goes positive. Eventually the speed of rotation of timing wheel 18 will increase so that the positive pulse on grids 50g and 50s will coincide. This causes the voltage of plate 50p to drop. This negative going signal is inverted by tube 76 which has unity gain. The positive going output signal of tube 76 passes through diode 82 and charges capacitor 90. The capacitance of capacitor 90 and the resistance of resistor 88 are such that the time constant of the two in parallel is longer than the period between successive hot spot pulses. As the speed of wheel 18 increases still further the positive signal of grids 48g and 48s will approach coincidence. When the signals coincide there will be a negative going signal at plate 48p which is connected to diode 62 without inversion. This negative going signal passes through diode 62 and charges capacitor 68 with a negative charge. The capacitance of capacitor 68 and resistance of resistor 66 are such that the time constant of the two in parallel is longer than the period between successive hot spot pulses. The negative potential existing at point 128 is amplified by amplifier 70 and energizes relay coil 102. This opens contact 102C and closes contact 102C1, thus connecting grid 104g to plate 92p through resistor 106. Therefore, the speed of motor 30 is dependent upon the voltage of plate 92p. The potential of plate 92p depends upon the potential of grid 92g which is connected through resistor 97 to point 130. Resistors 94 and 96 are of equal value so that point 130 will be at ground potential when the charge on capacitors 68 and 90 are of equal magnitude but of opposite potential. When the timing wheel 18 is rotating so that its peripheral speed is greater than the speed of strip S tube 48 will have a high output for a longer time than tube 50 because grids 48g and 48s will be at a positive potential simultaneously for a longer period than grids 50g and 50s. This higher output is transmitted through diode 62 and causes capacitor 68 to charge to a more negative potential than the positive potential on capacitor 90, thus causing the potential at point 130 and grid 92g to fall. The potential of anode 92p and grid 104g will rise, the potential of plate 104p and grid 116g will drop and the voltage across resistor 118 will decrease, thus causing motor 30 to slow down. If the timing wheel 18 is rotating too slowly the potential at point 130 will increase and the speed of motor 30 will increase. Thus, the speed of the timing wheel 18 becomes synchronized with the speed of the strip S so that the time required for a given hot spot to travel between the hot spot impressor 4 and hot spot detector 6 will be equal to the time required for the conducting segment 18s to travel from brush 16 to a point equi-distant between brushes 22 and 24. Therefore, the voltage output of tachometer generator 32 will be proportional to strip speed and the meter 34 will read strip speed directly in feet per minute. It will be apparent that the speed of the strip may also be regulated from the output of tachometer generator 32. Thus it it seen that the firing pulses for tube 8 are provided by the segment 18s of the rotating wheel 18 contacting brush 16 at periodic intervals and that gating pulses for tubes 48 and 50 are provided by the segment 18s contacting brushes 22 and 24. Since the speed of the wheel 18 varies, the time delay between the firing pulse and the associated gating pulse must also vary. The tubes 48, 50, 62, 76 and 82 and associated circuits provide means for comparing this time delay with the time required for the hot spot to move from impressor 4 to detector 6. The output signal from this comparing means is impressed on grid 92g of tube 92 which through the associated circuit causes the speed of motor 30 to vary until its peripheral speed is such that the segment 18s will travel from brush 16 to the mid-point between brushes 22 and 24 in the same time that the impressed hot spot travels from impressor 4 to detector 6.

While one embodiment of my invention has been shown and described it will be apparent that other adaptations and modifications may be made without departing from the scope of the following claims.

I claim:

1. Apparatus for measuring the speed of traveling strip comprising means for impressing a hot spot on the moving strip, means spaced from said first means along the path of strip travel for detecting the hot spot, means for producing firing pulses at periodic intervals, means for producing gating pulses with varying time delays after said firing pulses, means for comparing the delay of each of said gating pulses after its associated firing pulse with the time required for the hot spot to move from said hot spot impressing means to said hot spot detecting means, means for varying said delay time until coincidence between the arrival of the hot spot at the detecting means and the production of a gating pulse is obtained by said last named comparing means, and means for converting said delay time into speed of strip travel.

2. Apparatus for measuring the speed of traveling strip according to claim 1 in which means for impressing a hot spot on the moving strip includes a rotating wheel having a non-conducting peripheral face, a conducting segment on said peripheral face, and a dual brush mounted adjacent said peripheral face and adapted to be contacted by said conducting segment to complete a circuit to said hot spot impressor.

3. Apparatus for measuring the speed of moving strip comprising a hot spot impressor adjacent the path of travel of said strip, a hot spot detector spaced from said impressor along the path of travel of said strip, a rotating wheel having a non-conducting peripheral face, a conducting segment on said peripheral face, a dual brush mounted adjacent said peripheral face and adapted to be contacted by said conducting segment to complete a circuit to said hot spot impressor, a second dual brush mounted adjacent said peripheral face and spaced from said first brush in the direction of travel of said wheel, a third dual brush mounted adjacent said peripheral face and spaced from said second brush a short distance in the direction of travel of said wheel, a motor for rotating said wheel, said hot spot detector including means for developing a potential when a hot spot passes thereby, a speed control for said motor, a circuit including said second and third brushes for varying the speed of said motor when the peripheral speed of said wheel is not synchronized with the speed of said strip, and means controlled by said wheel for indicating strip speed.

4. Apparatus for measuring the speed of moving strip comprising a hot spot impressor adjacent the path of travel of said strip, a hot spot detector spaced from said impressor along the path of travel of said strip, a rotating wheel having a non-conducting peripheral face, a conducting segment on said peripheral face, a dual brush mounted adjacent said peripheral face and adapted to be contacted by said conducting segment to complete a circuit to said hot spot impressor, a second dual brush mounted adjacent said peripheral face and spaced from said first brush in the direction of travel of said wheel, a third dual brush mounted adjacent said peripheral face and spaced from said second brush a short distance in the direction of travel of said wheel, a motor for rotating said wheel, said hot spot detector including means for developing a potential when a hot spot passes thereby, two gated amplifiers, a circuit including said second dual brush for controlling the operation of the first gated amplifier, a circuit including said third dual brush for controlling the operation of the second gated amplifier, a phase changer connected to said first gated amplifier, a first diode connected to said phase changer, a second diode connected to said second gated amplifier, a speed control for said motor, and means connected to said speed control for varying the speed of said motor when the peripheral speed of said wheel is not synchronized with the speed of said strip.

5. Apparatus for measuring the speed of a moving object comprising means for creating heat energy, means for focusig said heat energy on said moving object, a heat sensing device spaced from said first named means along the path of travel of said object for detecting the hot spot, and means for determining the time required for the hot spot to move from said first means to said heat sensing device.

References Cited in the file of this patent

UNITED STATES PATENTS

| | | |
|---|---|---|
| 2,569,974 | Campbell | Oct. 2, 1951 |
| 2,640,936 | Pajes | June 2, 1953 |
| 2,786,978 | Warner | Mar. 26, 1957 |